UNITED STATES PATENT OFFICE.

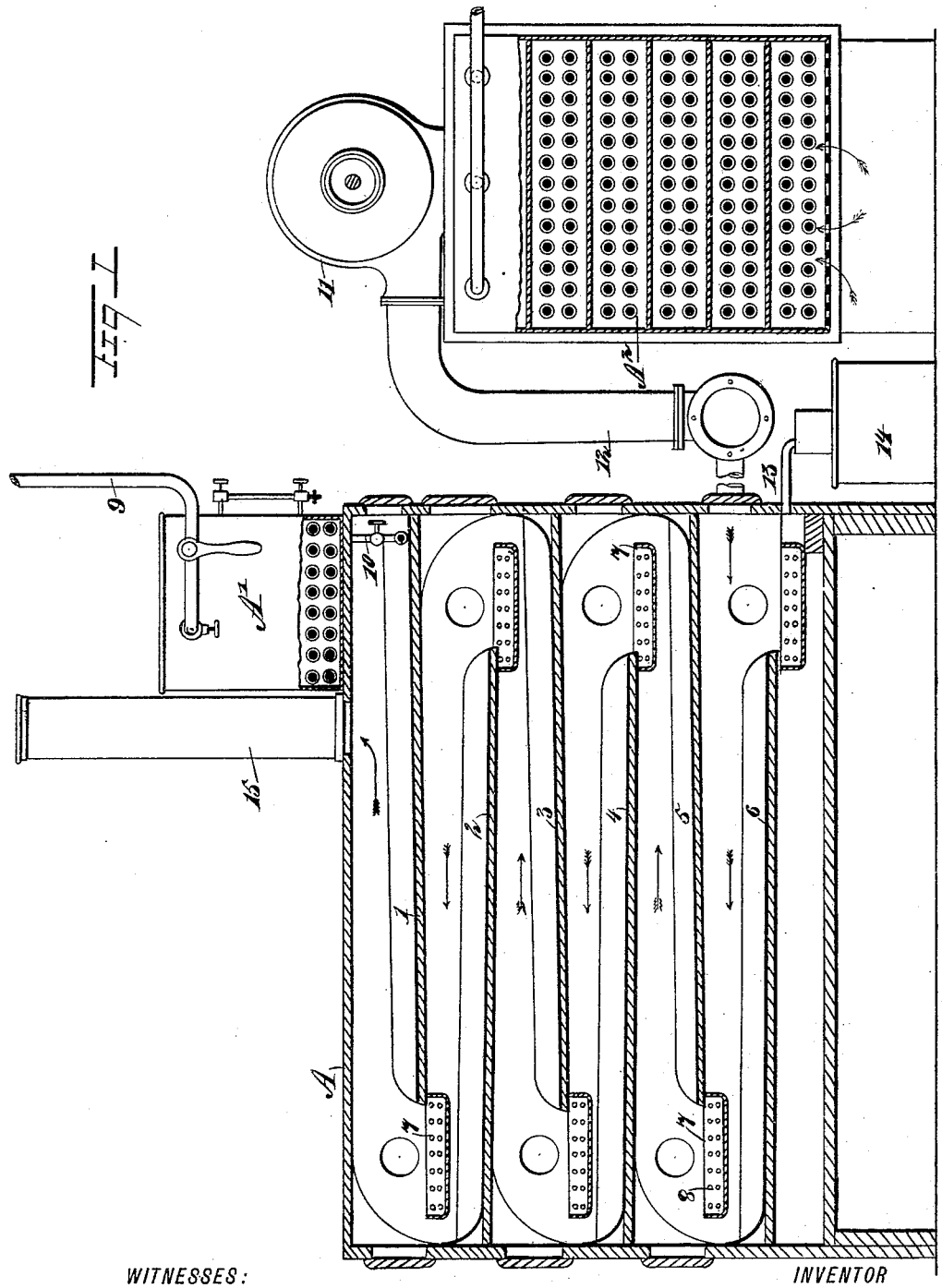

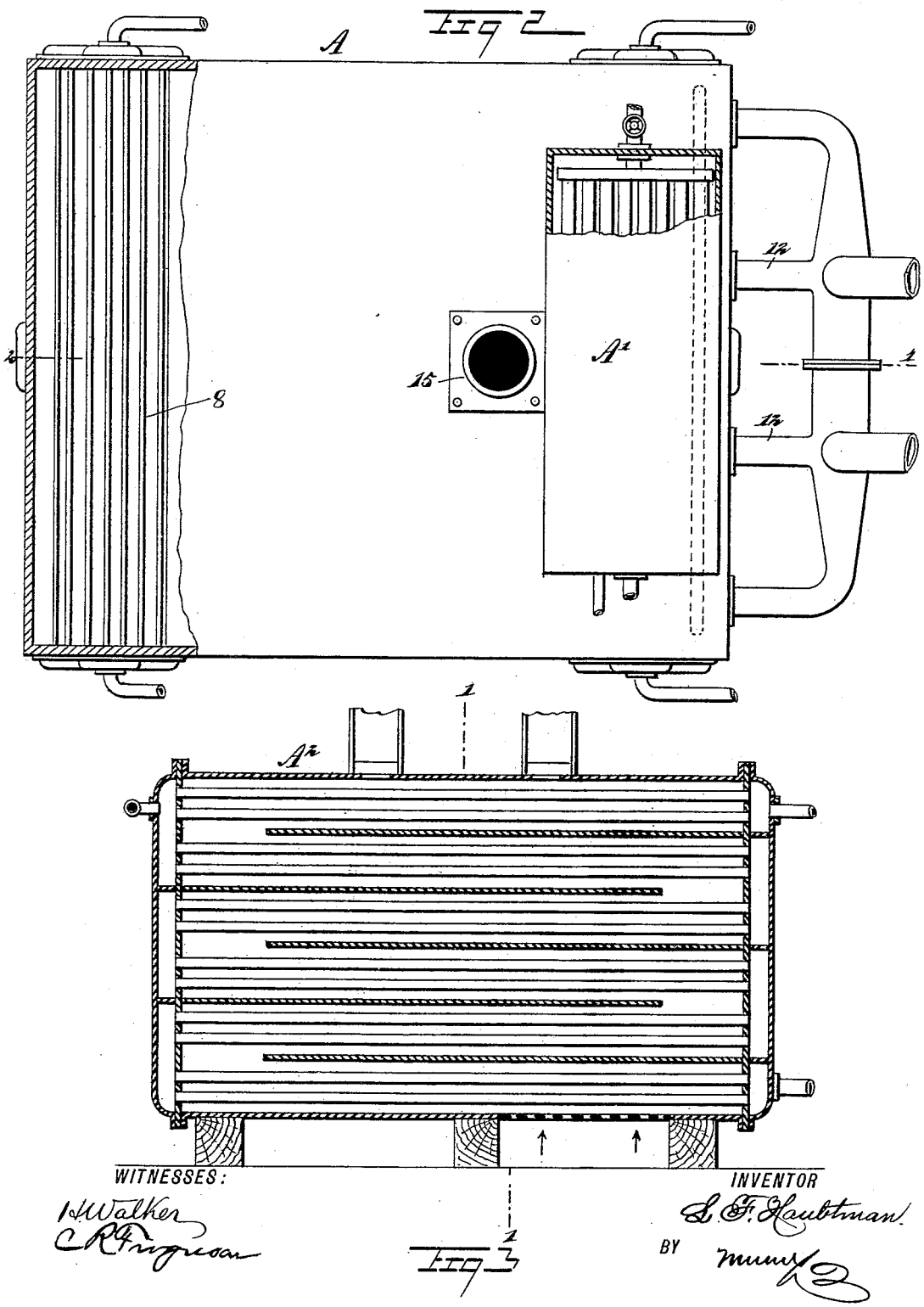

LEON FRANCOIS HAUBTMAN, OF NEW ORLEANS, LOUISIANA.

APPARATUS FOR EVAPORATING LIQUIDS.

SPECIFICATION forming part of Letters Patent No. 569,456, dated October 13, 1896.

Application filed June 8, 1896. Serial No. 594,703. (No model.)

*To all whom it may concern:*

Be it known that I, LEON FRANCOIS HAUBTMAN, of New Orleans, in the parish of Orleans and State of Louisiana, have invented a new and Improved Apparatus for Evaporating Liquids, of which the following is a full, clear, and exact description.

The object of this invention is to provide a very simple apparatus by means of which moisture may be quickly absorbed from a liquor, such, for instance, as a saccharine liquor.

I will describe an apparatus embodying my invention, and then point out the novel features in the appended claims.

Reference is to be had to the accompanying drawings, forming a part of this specification, in which similar characters of reference indicate corresponding parts in all the views.

Figure 1 is a vertical section of an apparatus embodying my invention. Fig. 2 is a top plan view and partial section thereof, and Fig. 3 is a vertical section of a heater employed.

Referring to the drawings, A indicates a suitable casing, preferably formed of metal, and having arranged longitudinally within it, one above another, a series of liquid-carrier plates 1, 2, 3, 4, 5, and 6. These liquid-carrier plates each extend from one end wall of the casing A nearly to its opposite end, thus providing an opening between the end of the plate and the end of the casing, the openings being arranged alternately at opposite ends of the casing, and each of these plates, it will be seen, is inclined downward to its opposite end. At the end of each plate is arranged a liquid-receiver 7, each being provided with a series of steam heating-pipes 8, receiving steam from any desired source.

On the top of the casing A is mounted a tank A' for the liquor to be treated. This tank A' has a suitable valve-controlled inlet-pipe 9 and a valve-controlled outlet-pipe 10 leading into the upper condensing-chamber of the series. A heater A², consisting of a series of steam-pipes arranged within the casing, has mounted on it one or more rotary blowers or fans 11, designed to draw air up through the perforated bottom of the heater and around the pipes contained therein and force the said heated air through the pipe 12 into the lower chamber 6 in the casing A.

In operation the valve in the pipe 10 is opened to the desired extent, allowing the liquid to run into the inclined plate 1, and over which it will flow in a thin stream into the liquid-receiver 7, and when this receiver 7 is full the liquid will flow over its sides or front side onto the next plate 2 below it, and this flow of liquid of course will continue until it finally discharges through a pipe 13 into a receiving-tank 14, and during this flow of liquid the heated air forced through by the fan 11 and taking the direction of the arrows shown in Fig. 1 will take up or absorb the moisture from the liquid and finally discharge through a chimney 15.

It is to be understood that I may employ a suction-fan located on the upper side of the apparatus instead of the force-fan, as shown and described.

Having thus described my invention, I claim as new and desire to secure by Letters Patent—

1. An apparatus of the class described, comprising a casing, a series of inclined plates arranged therein and forming chambers having communication one with another, a liquid-receiver at the end of each plate, means for heating liquid in said receivers, a supply-tank for the apparatus, and means for forcing heated air through the apparatus in a direction opposite to that in which the liquid is flowing, substantially as specified.

2. An apparatus of the class described, comprising a casing, a series of plates arranged longitudinally therein and inclined alternately in opposite directions, liquid-receiving vessels at the ends of the plates and adapted to overflow the liquid from one plate onto the plate immediately below, means for heating liquid in the receivers, a liquid-tank arranged on the top of the casing, a valve-controlled pipe leading from said tank into the upper portion of the casing above the first evaporating-plate, heating-pipes arranged in said liquid-tank, a heater arranged adjacent to the casing, an air-blower arranged on said heater and receiving air therefrom, and a pipe leading from the blower into the lower chamber within the casing, substantially as specified.

LEON FRANCOIS HAUBTMAN.

Witnesses:
   GEO. BALDING,
   JNO. D. TOWNSEND.